(12) United States Patent
Hestetun

(10) Patent No.: US 11,802,649 B2
(45) Date of Patent: Oct. 31, 2023

(54) PIG LAUNCHER

(71) Applicant: Vetco Gray Scandinavia AS, Sandvika (NO)

(72) Inventor: Steinar Lindemann Hestetun, Høvik (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 495 days.

(21) Appl. No.: 17/253,657

(22) PCT Filed: Jun. 21, 2019

(86) PCT No.: PCT/EP2019/025195
§ 371 (c)(1),
(2) Date: Dec. 18, 2020

(87) PCT Pub. No.: WO2019/242894
PCT Pub. Date: Dec. 26, 2019

(65) Prior Publication Data
US 2021/0262604 A1  Aug. 26, 2021

(30) Foreign Application Priority Data

Jun. 22, 2018 (NO) .................................. 20180880

(51) Int. Cl.
*F16L 55/46* (2006.01)
*B08B 9/055* (2006.01)

(52) U.S. Cl.
CPC .............. *F16L 55/46* (2013.01); *B08B 9/055* (2013.01)

(58) Field of Classification Search
CPC .................................. F16L 55/46; B08B 9/055
See application file for complete search history.

(56) References Cited

U.S. PATENT DOCUMENTS

| 2,713,909 | A | * | 7/1955 | Baker | E21B 33/05 |
| | | | | | 15/104.062 |
| 2,948,142 | A | * | 8/1960 | Zimmerman, Jr. | F16L 55/46 |
| | | | | | 73/1.16 |
| 3,216,435 | A | * | 11/1965 | Poettmann | F16L 55/38 |
| | | | | | 137/802 |

(Continued)

FOREIGN PATENT DOCUMENTS

| CN | 203686473 U | 7/2014 |
| DE | 10160136 B4 | 3/2005 |

(Continued)

*Primary Examiner* — Umashankar Venkatesan
(74) *Attorney, Agent, or Firm* — HOGAN LOVELLS US LLP

(57) ABSTRACT

It is a pig launcher (1) comprising a pig magazine (2), launcher mechanism (3) and a connector (7) being connectable to a fluid flow line. The pig magazine (2) is able to hold a number of pigs arranged side by side, control lines (4) being connected to the pig magazine in such a way that each control line (4) is able to provide control fluid to manipulate a pig. The pig launcher further comprises a pig selector (5) being able to receive source control fluid from one control fluid source line (9) and to channel the control fluid to one of a number of control lines (4) being connected to the pig selector, thereby being able to launch one of the number of pigs by means of the control fluid.

15 Claims, 6 Drawing Sheets

(56) References Cited

U.S. PATENT DOCUMENTS

| | | | |
|---|---|---|---|
| 3,288,163 A * | 11/1966 | Craven | G01F 25/11 |
| | | | 15/104.062 |
| 3,562,014 A | 2/1971 | Childers et al. | |
| 5,046,522 A | 9/1991 | Le Devehat et al. | |
| 5,219,244 A * | 6/1993 | Skeels | F16L 55/46 |
| | | | 15/104.062 |
| 5,884,656 A * | 3/1999 | Smith | F16L 55/46 |
| | | | 15/104.062 |
| 6,336,238 B1 * | 1/2002 | Tarlton | F16L 55/46 |
| | | | 15/104.062 |
| 6,428,241 B1 * | 8/2002 | Stracke | F16L 55/46 |
| | | | 405/184.1 |
| 6,725,875 B2 * | 4/2004 | Mollard | F16K 11/0655 |
| | | | 15/104.062 |
| 6,841,007 B1 * | 1/2005 | Howard | B01D 29/96 |
| | | | 15/104.062 |
| 9,976,686 B2 * | 5/2018 | Sander | F16L 55/46 |
| 10,663,085 B2 * | 5/2020 | Pinho | F16L 1/161 |
| 10,801,658 B2 * | 10/2020 | Poe | F16L 23/006 |
| 11,073,002 B2 * | 7/2021 | Correc | E21B 43/017 |
| 2002/0170599 A1 | 11/2002 | Disher et al. | |
| 2004/0074030 A1 * | 4/2004 | Nehrbass | F28G 1/12 |
| | | | 15/104.062 |

FOREIGN PATENT DOCUMENTS

| | | |
|---|---|---|
| FR | 2588056 A1 | 4/1987 |
| WO | 2006/068929 A1 | 6/2006 |
| WO | 2016/094525 A1 | 6/2016 |

* cited by examiner

PIG LAUNCHER

The present invention relates to pig launchers for subsea use and more specifically to a pig launcher comprising a pig magazine, a launcher mechanism and a connector being suitable for connecting the pig launcher to a fluid flow line or pipeline. The pig launcher is removably connected to the fluid flow line and can be remotely operated.

Petroleum is often transported through pipe lines over substantial distances from the reservoir to a destination such as a floating production unit, refinery or depot. When the petroleum emerge from subterranean reservoirs the temperature is high and deposits do not present a problem. However, as temperature sink during transport away from the reservoir, the transported fluid leave deposits on the pipe walls and there is a continuous need for removal of such deposits. There is also a need for surveillance of pipelines to ensure damages or other potentially harmful incidents are detected. The removal and surveillance operations are done by pigs being introduced into the fluid flow close to the wells and thereafter led by the fluid flow through the pipes to the recovery station, normally at the end of the pipe lines e.g. at a floating production unit, refinery or depot. The pigs are then retrieved, undergo maintenance and can be reintroduced in a pipeline.

For some subsea fields, the launching point for the pig will be subsea at great distances from the coast leading to the need for a launching vessel to introduce the pigs manually or by means of an ROV assisted tool. For these fields, the pig can also be led through a dual pipeline down to the field. At the field, there are pigging loops, where the pig is passed from one production line and over to the other production line, where after the pig is sent back onshore or to a vessel through the production line for pipe clean-up.

Another solution is to arrange a magazine of pigs at an end section of a production pipe, often in connection with a production manifold, PLET or PLEM. By means of a remotely operated launching mechanism, the pigs are launched one by one when there is need for pigging service. The pig magazines comprise a limited number of pigs that are sent out, and when the magazine is empty, it is replaced by a filled up magazine. These remotely operated pig launching magazines are complicated structures comprising a number of valves and for some designs also an elaborate system for channelling hydraulic fluid to actuate pigs from their allocated positions in the magazine.

It is an object of the present invention to present a simplified remotely operated pig launcher.

It is therefore presented a pig launcher comprising a pig magazine, a launcher mechanism with an improved pig launching control system and a connector being connectable to a fluid flow line, the pig magazine being able to hold a number of pigs arranged successively front end to back end, control lines being connected to the pig magazine in such a way that each control line is able to provide control fluid to manipulate one pig, where a pig selector receive source control fluid from one control fluid source line and channel the control fluid to one of a number of control lines being connected to the pig selector, thereby being able to launch one of the number of pigs by means of the control fluid.

In relation to the pig launcher, it will be described that the control line being able to launch a pig is defined as being active and that the number of control lines not being active are blocked by means of the pig selector.

In accordance with the present invention, it is described a pig launcher comprising a pig magazine, an end cap, a connector and a pig launching control system, the pig magazine being a tube element wherein two or more pigs can be arranged in succession front end to back end. The pig launching control system comprises two or more control lines in fluid communication with the pig magazine. The pig launching control system further comprises a pig selector having one inlet, two or more outlets and a rotatable selector element. The rotatable selector element enables fluid communication from the inlet to one of the two or more outlets while closing the remaining outlets, the one inlet being in fluid communication with a control fluid source line, the two or more outlets each being in fluid communication with one of the two or more control lines, each of the two or more control lines providing control fluid to a preselected pig magazine inlet enabling the launch of one of two or more pigs positioned in the pig magazine (2).

The use of the above described pig launching control system removes the need for multiple control valves as one single valve can control the provision of control fluid to a number of control lines. The control system comprises a pig selector which by means of a remotely operated actuator or if desired by a rotation operation by an ROV tool, can serve multiple control lines and thereby multiple pigs in the pig magazine. This provides a significant simplification compared to prior art pig launching systems.

The pig launcher is provided with a connector that is connectable to and disconnectable from a pipeline. When all pigs of the pig launcher are launched, the pig launcher can be disconnected from the pipeline and hauled to the surface for maintenance and re-filling of pigs, thereby being ready for further use.

The pig launcher is also provided with an end cap that is removable to enable filling of pigs into the pig magazine or to do maintenance to the inner cavity of the pipe element.

The pig launcher according to this disclosure comprises a pig selector enabling control of multiple control lines. In preferred embodiments, the pig selector comprises an outer non-rotating selector body and an inner rotatable channel element. The selector body comprises an access hole in fluid communication with the control fluid source line and two or more control fluid holes in fluid communication with the two or more control lines. The inner rotatable channel element comprises a selector element, a channel and a rotatable stem. The channel forms a passage from the access hole to one of the two or more control fluid holes, blocking the remaining of the two or more control fluid holes, the channel being positioned by means of the rotatable stem.

In the pig launcher according to the disclosure, a section of the rotatable stem is protruding out of the selector body enabling rotation of the inner rotatable channel element. The protruding section of the rotatable stem is suitable for being connected to an actuator. The adaption to use of an actuator makes this solution suitable for all-electric systems subsea. However, the section can also be held and rotated by a rotation tool manipulated by an ROV. A funnel or bucket shaped guiding element will ease access to the protruding section of the channel element if it is chosen not to provide a permanent actuator on the pig selector. This makes the described pig launcher highly flexible.

In preferred embodiments of the pig launcher, the pig launcher is proved with a bonnet on the selector body covering the inner rotatable channel element. The bonnet covers an access through which the rotatable channel element can be introduced into the non-rotating selector body.

In the disclosure it is described that the bonnet of the pig launcher can be provided with one of an inlet hub comprising the access hole forming the inlet to the pig selector or a passage for the rotatable stem.

The pig launcher as described above can be provided with a guiding element being open at a first end and connected to the selector body or bonnet at the second end, the guiding element forming a bucket or funnel element, the rotatable stem protruding into the guiding element, enabling rotation of the rotatable stem by means of a rotating mechanism being provided into the guiding element.

According to some embodiments, the rotatable stem of the pig launcher can be remotely operated by means of an actuator. The actuator can be electrically operated. The use of a remotely operated actuator makes the pig launcher suitable for use on remote productions fields, such as on deep waters or very distant from a recovery station. The pig launcher is removably connectable to a pipe line by means of the connector. Furthermore, is the pig launcher suitable for being remotely operated.

For the pig launcher according to the disclosure, the provision of control fluid is being controlled by means of a remotely operated control fluid valve. By means of the rotatable pig selector, all control lines to the pig magazine can be controlled by the one control fluid valve.

The disclosure also describes the use of the above and below described pig launcher to launch at least one pig into a fluid flow containing pipeline and a subsea production field comprising at least one pig launcher as described herein.

The use of the above described pig launcher can be used to launch at least one pig into a fluid flow containing pipeline, thereby providing a reliable pig launching mechanism to service the pipeline.

It will also be understood that the pig launcher of this disclosure would be advantageous in a subsea production field where there is a need for introducing pigs into pipelines.

The invention will now be further described with reference to the attached drawings where FIG. 1 shows an embodiment of a typical manifold layout comprising pig launchers.

Figure 1:
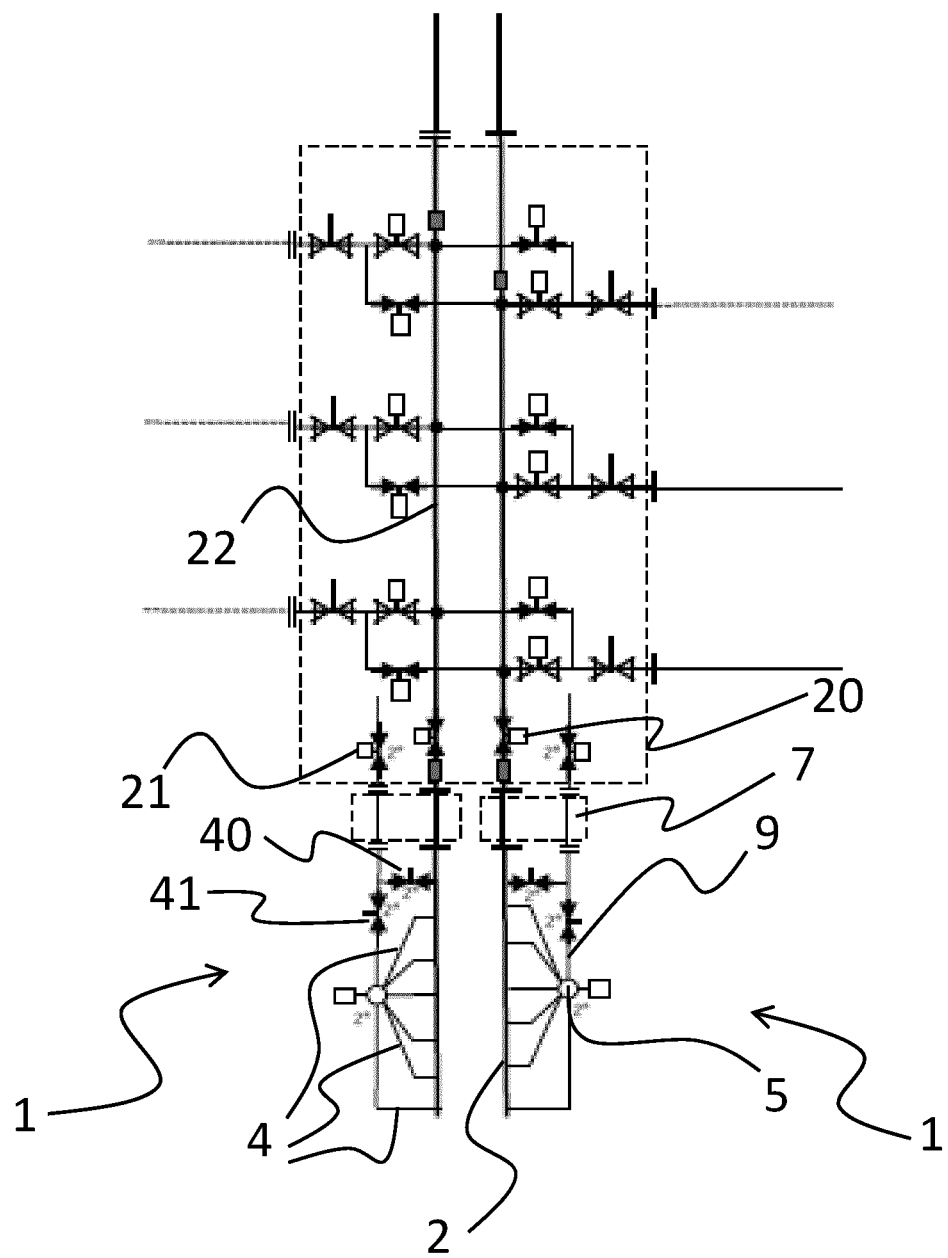

FIG. 1 shows an example of a manifold layout with a manifold provided with pig launchers 1 at each header or pipeline. This manifold layout is used at subsea production fields. The shown pig launcher is applicable to any subsea production field where there is a need for launching of pigs on the field.

Each pig launcher 1 comprises a pig magazine 2. The pigs accommodated in the pig magazine are pushed out of the magazine 2 by means of control fluid provided through a number of control lines 4. The control fluid is only channelled through one control line 4 at the time. The control line 4 providing fluid to the pig magazine 2 in order to push a pig out into the pipeline, can be defined as an active control line 4. The active control 4 is selected by means of a pig selector 5 that will be further described below. The control fluid is provided to the pig selector through a control fluid source line 9. The pig launchers 1 are removably connected to the pipeline by means of a connector 7. When all the pigs in the magazine 2 are launched, the empty pig launcher can be replaced by a new filled up pig launcher, while the empty pig launcher is retrieved, necessary maintenance is done and the pig launcher is made ready for new use.

A main valve 20 controls the channel between the pig magazine 2 and the production line or pipeline 22. A control fluid valve 21 controls the provision of control fluid. When a pig is going to be launched from the pig launcher, the main valve 20 is opened forming an open passage from the pig magazine 2 and into the production line or pipeline 22. When there is an open passage between the pig magazine 2 and the pipeline 22, the pressure inside the pig magazine 2 will be the same as in the pipeline 22. The pig selector 5 select the control line 4 providing control fluid to the pig closest to the connector 7 and main valve 20 and start flowing fluid into the magazine 2 behind the selected pig with a pressure higher than the pipeline pressure. The pig is pushed out by the increased pressure until it is caught in the fluid flow and passed on through the pipeline 22 in the production flow.

There may also be a flush valve 40 which can be opened to flush the outer section of the pig launcher 1 and connectors 7 and an isolation valve 41 which is closed until the pig launcher is properly connected to the pipe line and fluid line interfaces. When the pig launcher 2 is connected to the pipe line 22, the pig selector 5 is connected to a control fluid source line 9 and the isolation valve 41 can be opened. To flush the outer section, the flush valve is opened and the isolation valve is closed. For normal operation of the pig launcher, the flush valve is closed and the isolation valve is opened.

When it is decided to launch a pig, the main valve 20 of the pipeline is opened. A control fluid valve 20 is then opened to provide control fluid via the fluid source line 9 to the pig selector 5 and further to a selected control line and into the pig magazine 2.

Figure 4:
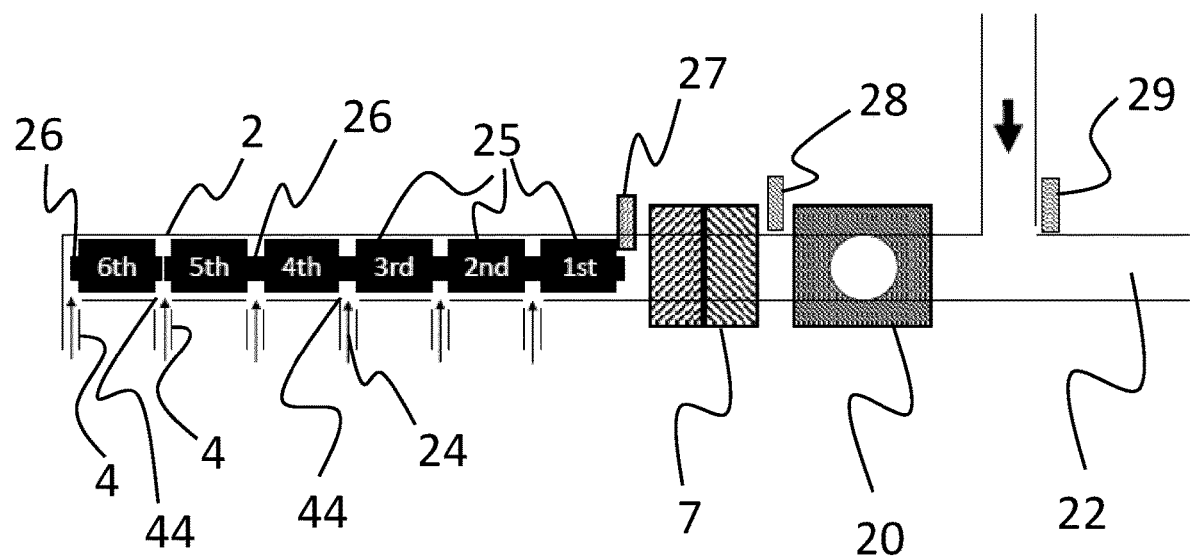
FIG. 4 shows a cross sectional view of a pig launcher magazine.

A set of pig detectors 28, 29, see FIG. 4, verify that the pigs are launched and properly caught by the production flow. The pig detectors 28, 29 are arranged at the exit of the pig launcher and at the entry area for entry of the pig in the production flow. The control fluid valve 21 is closed as soon as the pig has passed the detectors 28, 29 at detection points at the exit of the pig magazine and adjacent to the production flow in the pipeline. The main valve 20 will then be closed and the pig launcher is maintained closed until it is time to launch the next pig in line.

It will be understood that the pig launcher can also be provided at other subsea structures, such as pipeline end manifolds (PLEM) or terminations (PLET).

Figure 2:
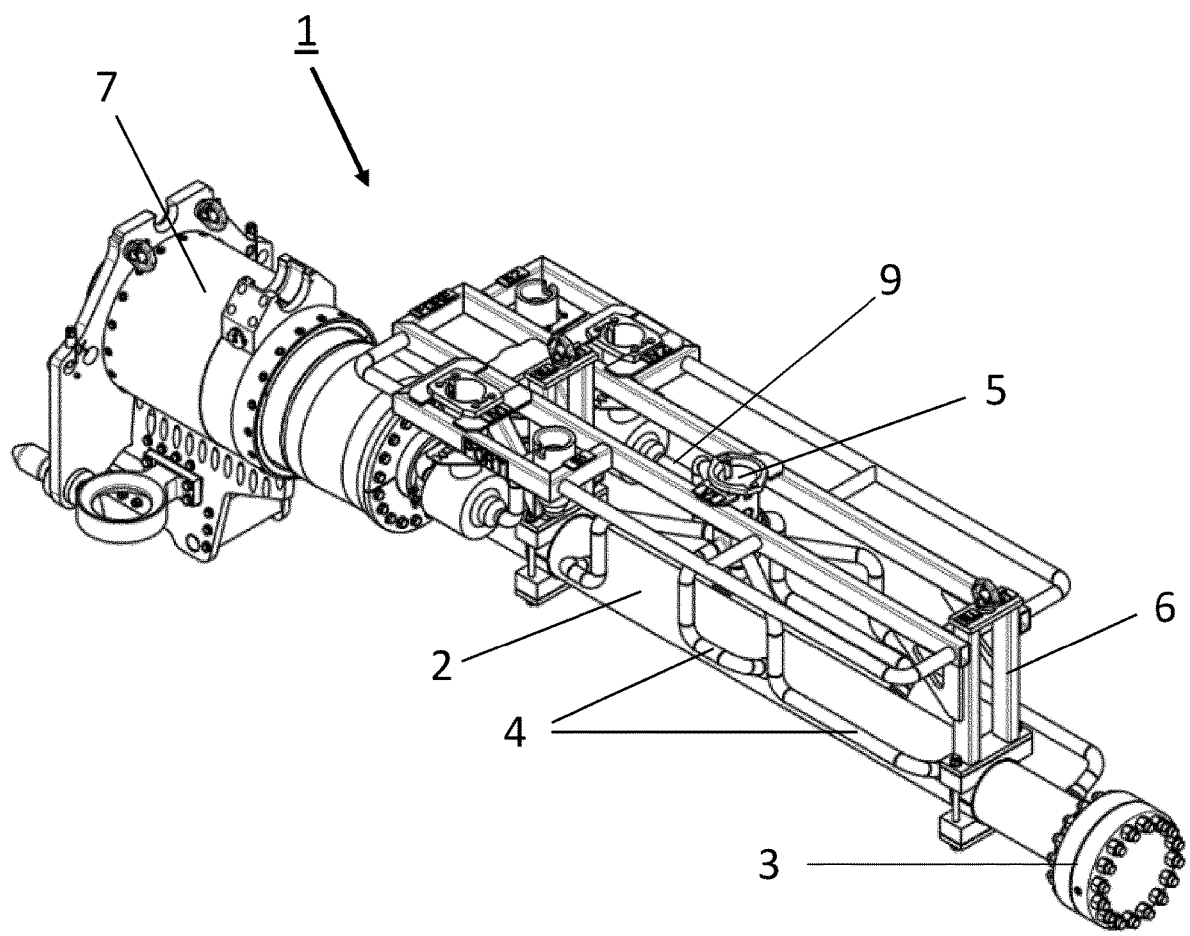
FIG. 2 shows a perspective view of a pig launcher according to the invention.
Figure 3:
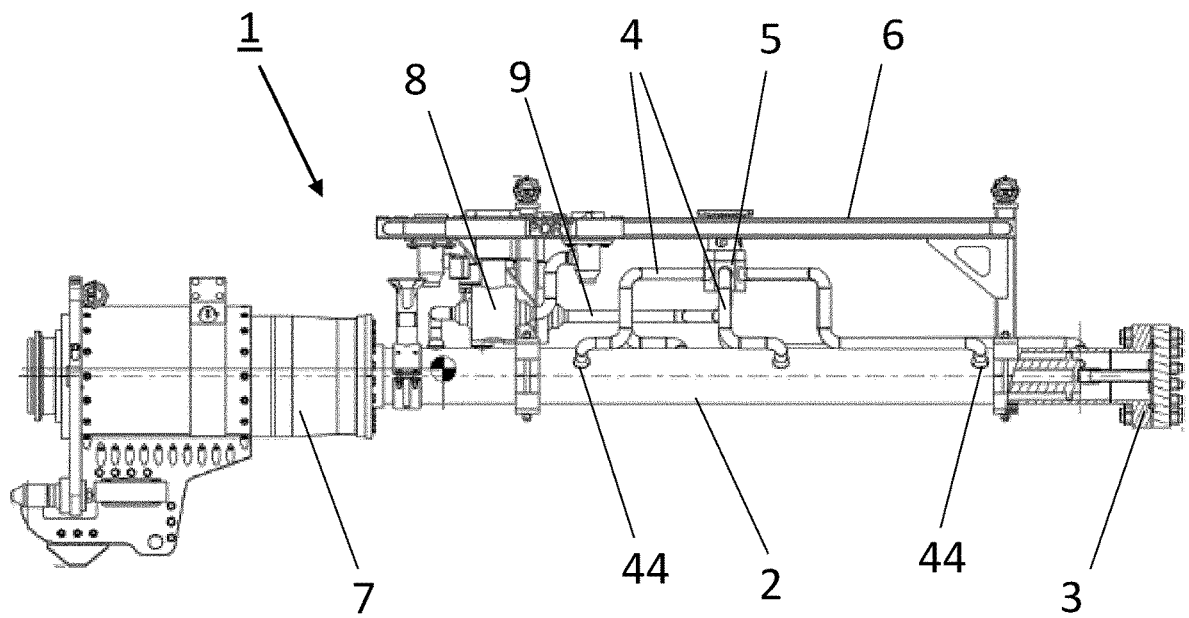
FIG. 3 shows a side view of the pig launcher of FIG. 2.

The pig launcher will now be further explained with reference to FIGS. 2 and 3. FIG. 2 shows a perspective view of a pig launcher 1 while FIG. 3 shows the same pig launcher in a side view.

The pig launcher 1 comprises a pig magazine 2, an end cap 3, control lines 4, a pig selector 5, frame structure 6 and a connector 7 for connection to a pipeline. The pig magazine 2 is formed of a pipe element suitable for storage of a number of pigs arranged inside the pipe and along the length of the pipe element. The pipe element forming the pig magazine 2 is provided with a removable end cap 3 at one end. When there is a need for entering pigs into the magazine 2, the end cap 3 is removed and the pigs can be entered. When the magazine is full, the end cap close this end section until the next re-fill.

The connector 7 is a standard connector suitable for connection to a pipeline. It is removably connected to the pipeline and can be replaced by a new pig launcher, when the connected pig launcher need maintenance and is disconnected and pulled to surface.

The control lines 4 are connected to the pig selector 5 at one end and to a position on the pig magazine at the other end, enabling fluid to flow from the pig selector 5 to a position between two pigs in the magazine, i.e. behind the pig the control line is destined to activate. Each pig is provided with spacers 26 at each end, see FIG. 4, to ensure open space between the pigs. The spacers will ensure that the control fluid being provided to the space behind the pig to be launched will flow between two neighbouring pigs pushing the outermost out of the magazine while the next in line is maintained in the magazine. This way it is ensured that only the selected pig is launched at each launching event.

To channel control fluid to each pig, a number of control lines are provided, one for each inlet 44 behind each of the pigs, i.e. at each partly open space between two neighbouring pigs. All control lines 4 are connected to the common pig selector 5. Source control fluid is provided to the pig selector 5 from one single control fluid source line 9. The pig selector 5 provides fluid communication with one of the control lines 4 at the time, thereby activating the one pig being controlled by this specific active control line. The remaining control line 4 are closed by the pig selector 5. This will be further described below.

The control fluid supplied through the active control line 4 can be provided from a control fluid source 8 to the control fluid source line 9. If there is a control fluid source 8 on or close to the pig launcher, the control fluid valve 22 control the provision of control fluid from the fluid source 8 to the control fluid source line 9 or pig selector 5. When the fluid source is distant from the pig launcher, the control fluid valve 22 control provision of control fluid through the fluid source line 9 to the pig selector. In any instance, a single control fluid source line 9 provide fluid to the pig selector 5, where it is channelled to the one active control line of the number of control lines 4. The number of control lines 4 corresponds to the number of pigs that can be stored on the pig magazine 2. The control lines 4 not being active, i.e. are not providing fluid to the magazine, are blocked by the pig selector 5.

The frame structure 6 is used when handling the pig launcher between locations, for protection of the components of the pig launcher and as guidance means.

FIG. 4 shows a principle drawing of some elements of the pig launcher. The pig launcher is connected to the pipeline 22 by means of a connector 7. A retractable pig stopper 27 is arranged adjacent to the connector 7 during installation. The main valve 20 is arranged in the pipeline close to the pig launcher. In the pig magazine 2 a number of pigs 25 are stored side by side in succession back end to front end. The pigs 25 are provided with spacers 26 ensuring there is a partly open space between two neighbouring pigs 25 to allow correct access of control fluid. The control lines 4 are connected to a pig magazine inlet 44 behind each of the pig positions in the pig magazine 2 providing control fluid behind each of the pig positions. One or more detectors or pig indicators 28, 29 are arranged at the exit of the pig magazine and at the start of the pipeline where the pig will be caught by the fluid flow to detect the pig leaving the pig launcher and that the pig is pushed into the production flow.

Figure 5:
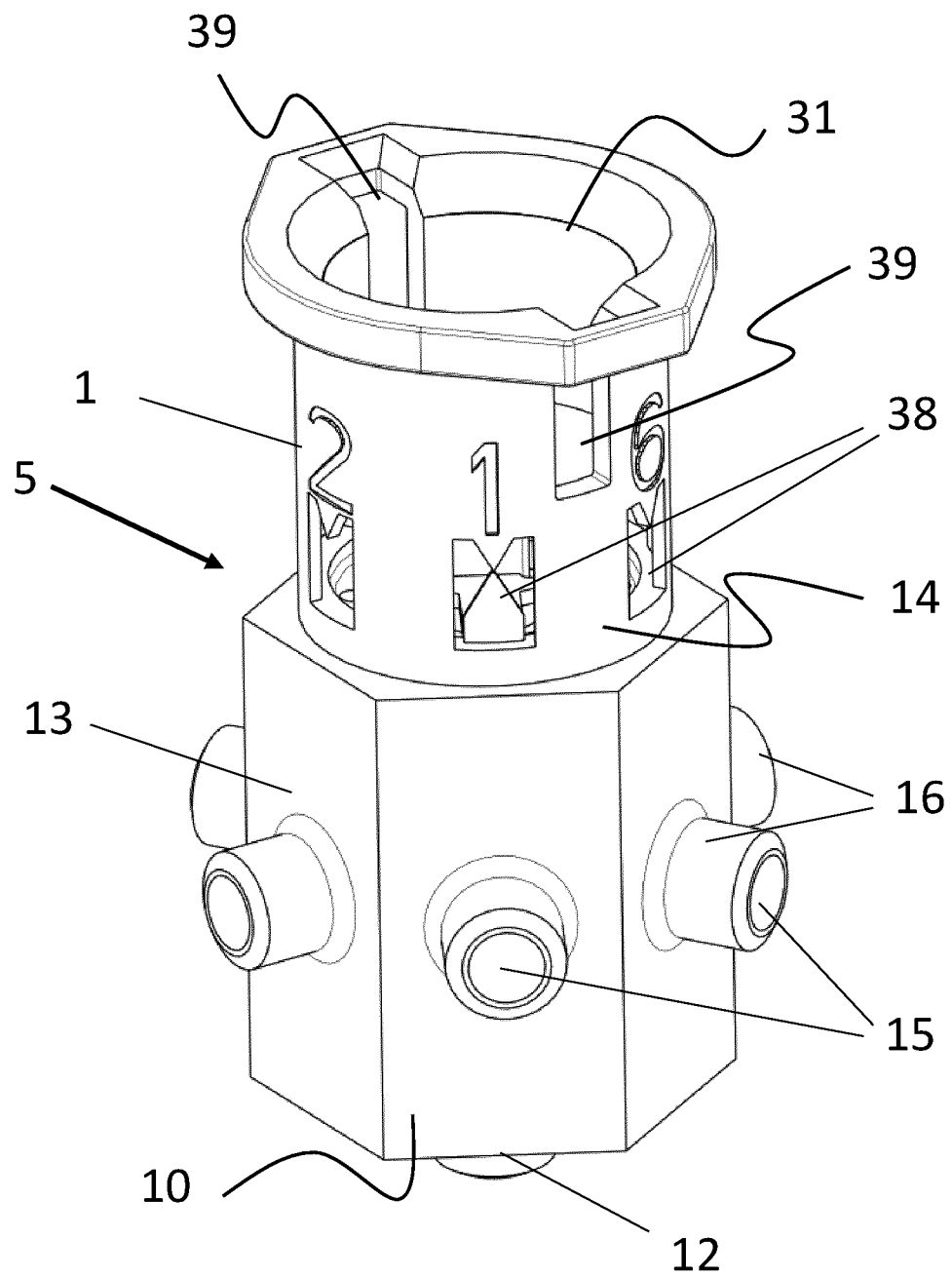
FIG. 5 shows a perspective view of a pig selector.
Figure 6:
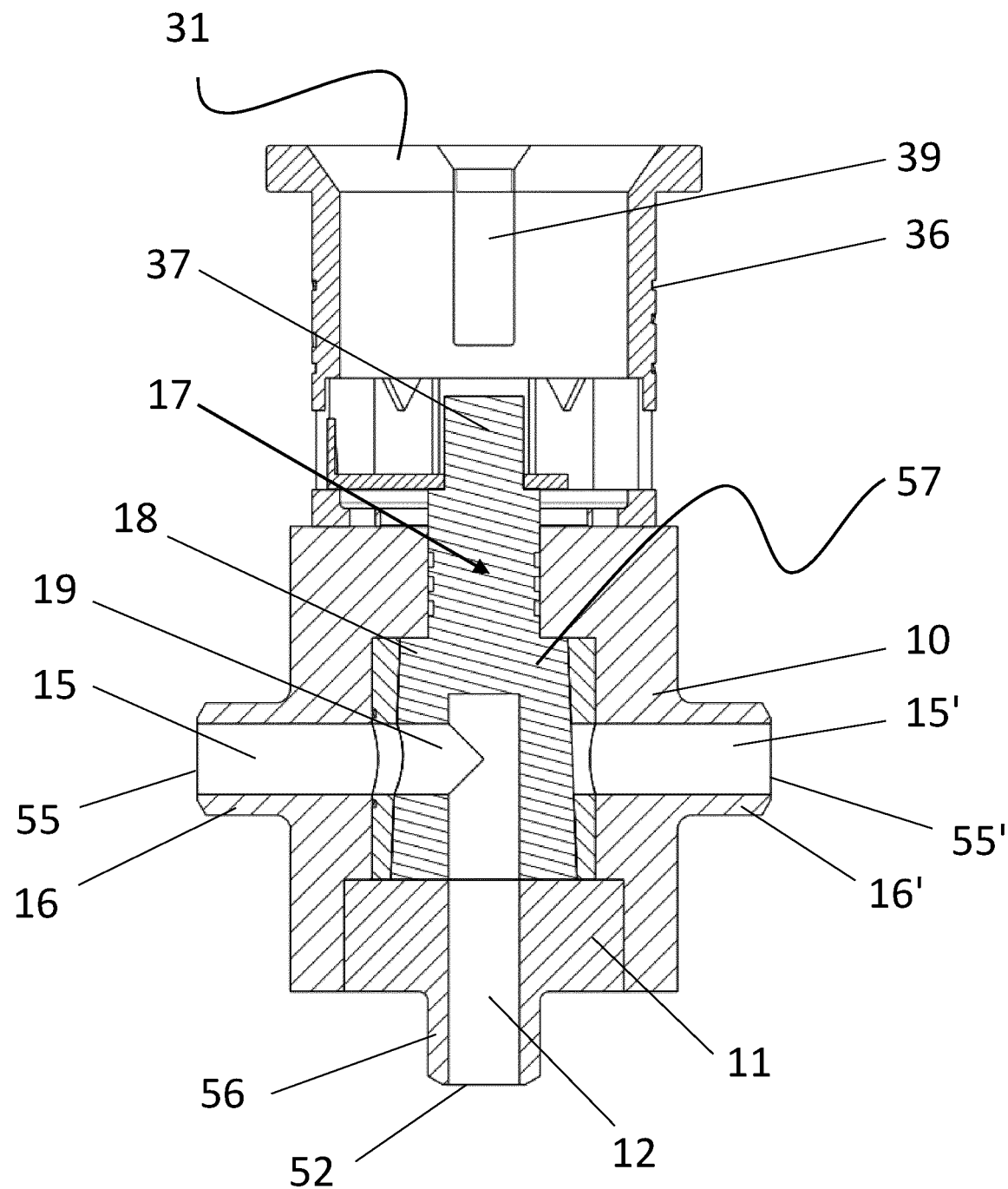
FIG. 6 shows a cross sectional view of the pig selector.

FIGS. 5 and 6 shows an embodiment of the pig selector 5 of the pig launcher 1. The shown pig selector comprises one inlet through an access hole 12 and a number of outlets through control fluid holes 15. The inlet of the access hole 12 is in fluid communication with the fluid source line, while outlet of the control fluid holes 15 are in fluid communication with one control line each.

In the shown embodiment, the pig selector 5 has one inlet 52, two or more outlets 55, 55' and a rotatable selector element 18. The rotatable selector element 18 enables fluid communication from the inlet 52 to one of the two or more outlets while closing the remaining outlets. The one inlet 52 being in fluid communication with a control fluid source line, the two or more outlets 55 each being in fluid communication with one of the two or more control lines. Each of the two or more control lines provide control fluid to a pre-selected pig magazine inlet in the pig magazine pipe wall providing control fluid to enable the launch of one of two or more pigs positioned in the pig magazine.

The shown embodiment of the pig selector 5 is formed of a non-rotating hollow selector body 10 in which an inner rotatable channel element 57 is arranged. The rotatable channel element 57 may be covered by a bonnet 11. A section 37 of the rotatable channel element 57 protrudes from the selector body. The rotatable channel element 57 can be rotated by an actuator holding this protruding section 37 and turning it to a selected position. The selector body may be provided with a torque bucket 36 or guiding element 31. The protruding section 37 of the rotatable channel element 57 protrudes into the torque bucket or guiding element. The actuator can be entered into the torque bucket or guiding element where it is connected to the protruding section 37 of the inner rotatable stem 17. The shown torque bucket 31 is provided with indicators 38 showing the position of the protruding section for inspection. The torque bucket can also be provided with reaction grooves 39 in the wall for fixation of the actuator when it rotates the channel element 57.

In one end of the selector body 10, there is an access hole 12 to which the control fluid source line 9, see FIG. 1, is connected. The selector body 10 has a sectioned outer wall 13. In the sectioned outer wall 13 of the selector body, there are a number of control fluid holes 15. In the shown embodiment the control fluid holes 15 are arranged in hubs 16. Each one of the control lines 4 are connected to each one of the hubs comprising control fluid holes 15. The number of hubs corresponds to the number of control fluid outlets. The number of control fluid outlets corresponds to the number of control lines and to the number of pigs in the pig magazine.

During operation of the pig launcher, control fluid will be channelled from the control fluid source line, into the rotatable channel element 57 via the access hole 12 and out through the one open or active control fluid hole 15. The remaining control fluid holes 15, that are not active, are blocked by the inner rotatable channel element 57, see FIG. 6. The bonnet 11 is holding the channel element 57 in the selector body 10 and is sealed by means of multiple seals. There are also seals between the rotatable channel element 57 and the selector body.

The torque bucket or guiding element 31 is open at a first end and is connected to the bonnet 11 or the selector body 10 at the second end, forming a bucket or funnel element on the pig selector 5. An inner rotatable stem 17 protrudes into the guiding element 31, see FIG. 6. The control fluid line corresponding to the pig to be launched is activated by rotating the rotatable stem 17 to open the channel towards the selected control fluid hole 15 and control fluid line, blocking the remaining control fluid holes and control fluid lines.

FIG. 6 shows a cross section of the embodiment of the pig selector 5 with the inner rotatable channel element 7 located inside the selector body 10. The rotatable channel element has an inner channel 19 forming a fluid connection between the access hole 12 and one of the control fluid holes 15.

The shown selector rotatable channel element 57 comprises a selector element 18 being formed with a cylindrical stem or plug. However, the selector element can also be ball shaped with an angular inner channel forming the passage from the access hole 12 to the active control line. The outer surface of the ball shaped selector will block the control lines 4 that are not active.

When the rotatable selector element 18 is rotated to another position, it will channel fluid from the access hole 12 to one of the other control fluid holes 15'. The rotatable selector element 18 is rotated by means of a rotating stem 17 comprising a protruding section 37 protruding out of the pig selector or selector body 10.

A guiding element 31 is mounted on the pig selector. The guiding element 31 is formed as a bucket or funnel with a first open end and a second partly closed end suitable for connection to the pig selector. The guiding element 31 can be connected to the selector body 10, to the bonnet 11 or both, depending on where the bonnet 11 is placed."

The bonnet 11 is provided for facilitating introduction of the inner rotatable channel element into the selector body. The bonnet can be arranged on the inlet side of the pig selector, as shown in FIG. 6. The bonnet will then be provided with an inlet hub 56 holding the access hole 12 forming the inlet of the pig selector 5. However, the bonnet can also be provided at the opposite side of the selector body 10, where a section 37 of the inner rotatable stem 17 is protruding from the pig selector. The bonnet will then be provided with a passage for the stem 17, so that the stem protrudes out of the selector body 10, through the bonnet 11 and into a guiding element 31, where the outer protruding section 37 of the stem can be rotated to a selected position by means of a suitable tool.

In the shown embodiment, the protruding section 37 is accessible via the open first end 31 of the torque bucket 36 being arranged on the pig selector 5. Rotating of the stem can be done by an ROV activated tool or by a permanent or removable actuator. It is conceivable to use either an electrical actuator or a hydraulically operated actuator. As the pig launcher will be activated at intervals and if these intervals are of long duration, it can also be conceivable to provide temporary tooling for rotation of the inner stem. However, as it is essential to rotate the channel element 57 to the correct position related to the chosen control line 4, it is likely that an actuator will provide the necessary level of precision.

The use of the pig selector 5 on a pig launcher will provide substantial simplification to the pig launcher structure, while maintaining all necessary levels of security related to barriers and fluid control.

In other words, the pig selector of the pig launcher comprises a selector body covered by a bonnet. An access hole is provided in the selector body. The access hole is connectable to a control fluid source line. The pig selector further comprises a sectioned outer wall of the selector being provided with a number of control fluid holes being connectable to the number of control lines, the access hole being in fluid connection to one of the number of control fluid holes.

The pig selector comprises a rotatable channel element forming both a selector element and a channel, the channel connecting the access hole with one of the control fluid holes, the selector element blocking the remaining control fluid holes. A section of the rotatable channel element is protruding out of the selector body.

The pig selector further comprises a torque bucket or guiding element being open at a first end and connected to the selector body or bonnet at the second end, forming a bucket or funnel element. The guiding element is arranged on the selector body so that a section of the rotatable channel element of the pig selector can protrude into the guiding element.

The rotatable channel element can be rotated by means of a rotating mechanism being provided through the torque bucket or guiding element of the pig selector. Finally, the provision of control fluid can be controlled by means of a remotely operated control fluid valve.

The invention claimed is:

1. A pig launcher (1) comprising a pig magazine (2), an end cap (3), a connector (7) and a pig launching control system, the pig magazine (2) being a tube element wherein two or more pigs can be arranged in succession front end to back end, the pig launching control system comprising two or more control lines (4) in fluid communication with the pig magazine, characterised in the pig launching control system further comprises a pig selector (5) having one inlet (52), two or more outlets (55, 55') and a rotatable selector element (18), the rotatable selector element (18) enabling fluid communication from the inlet (52) to one of the two or more outlets while closing the remaining outlets, the one inlet (52) being in fluid communication with a control fluid source line (9), the two or more outlets (55) each being in fluid communication with one of the two or more control lines (4), each of the two or more control lines (4) providing control fluid to a preselected pig magazine inlet (44) enabling the launch of one of two or more pigs (25) positioned in the pig magazine (2).

2. The pig launcher (1) according to claim 1, characterised in that the connector (7) is connectable to a pipeline (22).

3. The pig launcher (1) according to claim 1, characterised in that the end cap (3) is removable to enable filling of pigs (25) into the pig magazine (2).

4. The pig launcher according to claim 1, characterised in that the pig selector (5) comprises an outer non-rotating selector body (10) and an inner rotatable channel element (57), the selector body (10) comprising an access hole (12) in fluid communication with the control fluid source line (9) and two or more control fluid holes (15, 15') in fluid communication with the two or more control lines (4), the rotatable channel element (57) comprising a selector element (18), a channel (19) and a rotatable stem (17), the channel (19) forming a passage from the access hole (12) to one of the two or more control fluid holes (15, 15'), blocking the remaining of the two or more control fluid holes (15', 15), the channel being positioned by means of the rotatable stem (17).

5. The pig launcher according to claim 4, characterised in a section of the rotatable stem (17) is protruding out of the selector body (10) enabling rotation of the inner rotatable channel element (57).

6. The pig launcher according to claim 4, characterised in a bonnet (11) on the selector body (10) covering the inner rotatable channel element (57).

7. The pig launcher according to claim 6, characterised in the bonnet (11) being provided with one of an inlet hub comprising the access hole (12) forming the inlet (52) or a passage for the rotatable stem (17).

8. The pig launcher according to claim 4, characterised in a guiding element (31) being open at a first end and connected to the selector body (10) or bonnet (11) at the second end, the guiding element (31) forming a bucket or funnel element, the rotatable stem (17) protruding into the guiding element (31), enabling rotation of the rotatable stem (17) by means of a rotating mechanism being provided into the guiding element (31).

9. The pig launcher according to claim 4, characterised in that the rotatable stem (17) is remotely operated by means of an actuator.

10. The pig launcher according to claim 9, characterised in that the actuator is electrically operated.

11. The pig launcher according to claim 1, characterised in that the pig launcher is removably connected to a pipe line by means of the connector (7).

12. The pig launcher according to claim 1, characterised in that the pig launcher is remotely operated.

13. The pig launcher according to claim 1, characterised in the provision of control fluid being controlled by means of a remotely operated control fluid valve (21).

14. Use of a pig launcher according to claim 1 to launch at least one pig into a fluid flow containing pipeline.

15. A subsea production field comprising a pig magazine (2), an end cap (3), a connector (7) and a pig launching control system, the pig magazine (2) being a tube element wherein two or more pigs can be arranged in succession front end to back end, the pig launching control system comprising two or more control lines (4) in fluid communication with the pig magazine, characterised in the pig launching control system further comprises a pig selector (5) having one inlet (52), two or more outlets (55, 55') and a rotatable selector element (18), the rotatable selector element (18) enabling fluid communication from the inlet (52) to one of the two or more outlets while closing the remaining outlets, the one inlet (52) being in fluid communication with a control fluid source line (9), the two or more outlets (55) each being in fluid communication with one of the two or more control lines (4), each of the two or more control lines (4) providing control fluid to a preselected pig magazine inlet (44) enabling the launch of one of two or more pigs (25) positioned in the pig magazine (2).

* * * * *